July 1, 1952     J. S. SILVER     2,601,866
CONTROL DEVICE
Filed March 5, 1946

INVENTOR.
J. S. SILVER
BY Lester W Clark
AGENT

Patented July 1, 1952

2,601,866

UNITED STATES PATENT OFFICE 2,601,866

CONTROL DEVICE

Jacob S. Silver, Terryville, Conn., assignor, by mesne assignments, to Niles-Bement-Pond Company, West Hartford, Conn., a corporation of New Jersey Application March 5, 1946, Serial No. 652,110

12 Claims. (Cl. 137—80)

The present invention relates to valve operating mechanism and particularly to mechanism for adjusting the travel of a valve in response to a given change in a controlling condition, for purposes of calibration. In the embodiment disclosed herein, my invention is illustrated as applied to a valve adapted to compensate the action of an aircraft carburetor in response to variations in air density.

A carburetor suited to use with the present invention is described in the patent issued to Harold F. Twyman, No. 2,391,755, dated December 25, 1945.

In aircraft carburetors of the general type to which the present invention is applicable, the air flow is usually measured by means of a primary Venturi meter which supplies an air pressure differential proportional to the square of the velocity of air flowing to the engine. For any given mass air flow, this differential varies inversely as the density of air being measured, and since fuel flow to the engine must be proportional to mass air flow, it is necessary to employ a density compensator (sometimes called an automatic mixture control or altitude-temperature compensator) in order that the air pressure differential obtained as a function of velocity may be corrected to an air pressure differential which is a function of mass air flow. The corrected, or effective, air pressure differential may then be used as a force-producing means employable to control fuel flow. Such compensators generally employ a spring-loaded bellows which controls the position of a contoured valve in a seat according to air density changes at the primary venturi.

An object of the present invention is to provide improved mechanism for manually adjusting a condition responsive element which operates a control device, such as a valve.

Another object of my invention is to provide, in a density compensating device including a valve, a valve seat and a spring loaded bellows for moving the valve, improved means for adjusting the relative positions of the valve and seat without affecting the adjustment of spring and bellows deflection.

A further object of the present invention is to provide improved means of rendering one of the above two adjustments mechanically independent of the other.

Other objects and advantages of the present invention will become apparent from a consideration of the appended specification, claims and drawing, in which:

Figure 1:
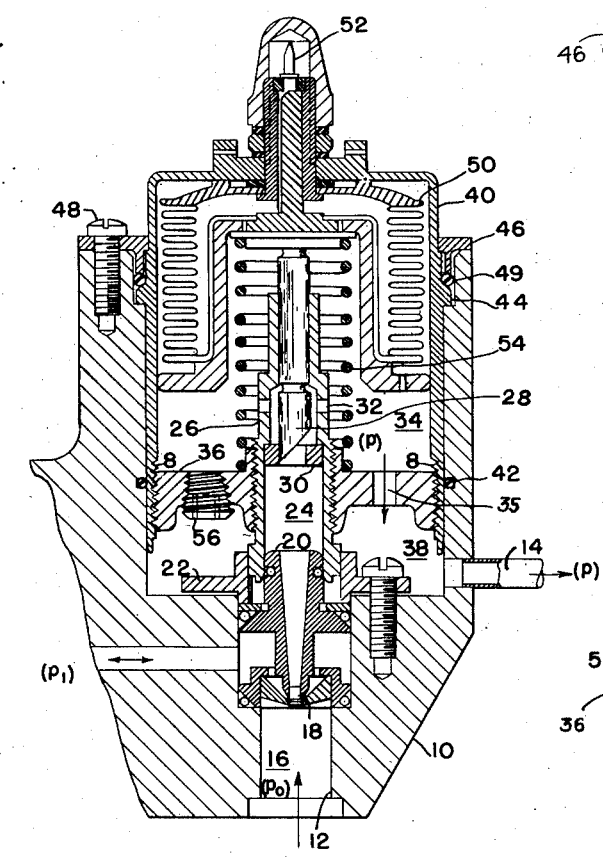
Figure 1 shows a cross-sectional view of a density compensator embodying the principles of my invention.
Figure 2:
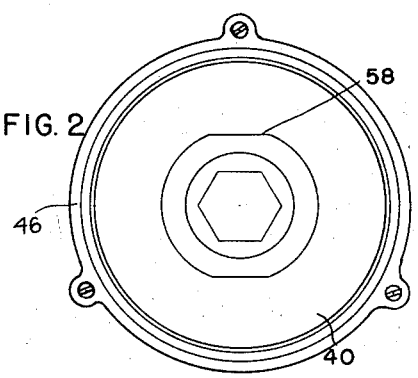
Figure 2 shows a plan view of the compensator of Figure 1.

Referring to Figure 1, there is shown a body 10, which may be an integral part of a carburetor body or a distinct part suitably attached thereto. An inlet 12 is connected by drilled channels or a tube or their equivalent to a source of air at pressure ($p_0$), the stagnation pressure at the entrance to the carburetor primary venturi, which is not shown; and a conduit 14, or equivalent conducts air from body 10 to the throat of the primary venturi, at pressure ($p$). The differential ($p_0-p$) varies directly as the square of the velocity of air flowing thru the primary venturi; but, at a given condition of mass air flow, the velocity of air flowing thru the throat of the primary venturi varies inversely as the air density, whence the air pressure differential ($p_0-p$) varies inversely as the air density and consequently is not a true measure of mass air flow.

The path of air flowing thru body 10 from inlet 12 to outlet 14 includes: a chamber 16, a restriction 18 in a boost venturi 20 which is detachably mounted in body 10 in a fixed position by a retainer 22; the path continues into chamber 24 in a valve guide 26 which is slidable but not rotatable in retainer 22, past a valve 28 through a valve seat 30, out of ports 32 in valve guide 26, into a chamber 34, thru unrestricted passages 35 in an adjustable ring 36 to chamber 38, whence it enters outlet 14.

A cup-shaped casing 40 is assembled into a correspondingly-shaped recess in body 10. A seal 42 prevents air leakage into chamber 38 thru clearance space between casing 40 and body 10; but does not interfere with relative motion therebetween. The height of casing 40 in body 10 is maintained constant by metal-to-metal contact at a supporting shoulder 44 and rotation of casing 40 in body 10 may be prohibited at will by means of a clamp 46 locked in position by tightening screws 48, whereby pressure between clamp 46 and clamping shoulder 44 on casing 40 and the friction due to compression of a ring seal 49 prevents rotation of casing 40 in relation to body 10, and serves as a supplementary air seal therebetween.

Figure 3:
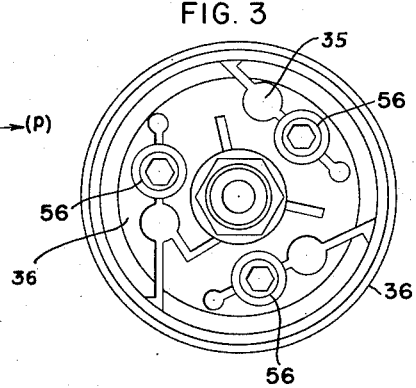
Figure 3 illustrates a means of insuring independency of two adjustments in accordance with the principles of my invention.

The upper end, as it appears in the drawing, of a bellows 50 is fixed inside the closed end of casing 40 and is sealed at a fill tube 52 after suitable suffusion with a fluid which renders the bellows responsive to temperature and pressure changes (or density changes) occurring in chamber 34 inside the casing 40. Thereafter the fixed end of bellows 50 is not moved in relation to its support for adjustment purposes. Valve 28 is held against the free end of bellows 50 by a spring 54 supported by ring 36 which is threaded into casing 40 and onto guide 26. It is made possible, by provision of tapered plugs 56 threaded into ring 36, which is partially split as shown in Figure 3, to expand ring 36 so that it becomes non-rotatable in casing 40. Thus, when plugs 56 are tightened, and screws 48 are loosened, casing 40 and ring 36 are rotatable together and when each rotation occurs ring 36 turns in relation to guide 26; rotation of the latter is prevented by provision of a splined connection or equivalent between retainer 22 and guide 26, so that rotation of ring 36 produces straight-line motion of guide 26 parallel to the center line of valve 28. Valve seat 30 is fixed to guide 26 so as to move with it. A press-fitted assembly of seat 30 and guide 26 is preferred.

Conversely, when plugs 56 are loosened, casing 40 is rendered rotatable on ring 36 and the torque required to produce such movement is made sufficiently less than torque required to turn ring 36 relative to guide 26 so that ring 36 remains stationary. This adjustment may be made only when casing 40 is removed from body 10, and the ring 36 may be conveniently held stationary under such conditions.

It is apparent from examination of the drawing, Figure 1, that when the casing 40 is disassembled from body 10, the deflection of spring 54 may be varied by turning ring 36 in casing 40. This operation, which is facilitated by provision of flats 58, also changes the position of valve 28 relative to seat 30; the desired relative positions of the valve and seat may then be obtained by turning guide 26 in ring 36 without permitting the latter to rotate in casing 40.

As bellows 50 moves in response to density changes in chamber 34, the passage between valve 28 and seat 30 varies as their relative positions change. Valve 28 is contoured in a manner such that at constant mass air flow, the pressure differential $(p_0-p_1)$ across restriction 18 remains constant. This differential is applied to a diaphragm or equivalent means whereby a force measuring mass air flow is developed and imposed on corresponding fuel flow control elements, a type of which is as described in Twyman Patent No. 2,391,755, previously referred to.

In Figure 1, restriction 18 is incorporated in a boost venturi which is effective to make the value of the differential $(p_0-p_1)$ a desired multiple of the corresponding differential obtained with a straight tube in lieu of the boost venturi.

The technique of adjustment may vary somewhat, but general procedure prescribes removal of casing 40 assembly from body 10 for adjustment of the spring 54, with plugs 56 loosened, following which plugs 56 are tightened and lockwired and casing 40 assembly is reinstalled with clamp 46 loose. Instruments are connected to measure $(p_0-p_1)$ and $(p_0-p)$. Casing 40 is then rotated by means of a tool applied to flats 58 until the desired value of the differential $(p_0-p_1)$ corresponding to the existing differential $(p_0-p)$ is obtained. Clamp 46 is then secured in place and the adjustment is tested throughout a range of values of the primary Venturi differential $(p_0-p)$.

The advantage of the dual adjustment above described is apparent when it is considered that the bellows is sealed under predetermined conditions of volume, pressure, and temperature and that its performance is predicted on the basis of the initial state of expansion of the fluid contained therein. Therefore, if on being installed it is necessary to alter the bellows length by means of a single adjustment in order to obtain a desired valve and seat relationship under a particular condition of pressure and temperature and if such an adjustment does not permit the bellows to operate at its standard length under standard conditions of temperature and pressure, actual performance will not agree with desired performance and may vary sufficiently from the predicted ideal to render the mechanism unsatisfactory. By use of the dual adjustment, the valve and seat relationship may be changed as required without altering the designed length of the bellows under standard pressure and temperature conditions.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. An air pressure regulator suitable for use in a carburetor, comprising: a casing containing a valve, a valve seat, a sealed expansible chamber effective to move said valve in said valve seat, said casing being adapted to support one end of said expansible chamber in a first air chamber on the downstream side of said valve, said sealed expansible chamber being responsive to pressure and temperature of the air in said first chamber; a regulator housing in which said casing is rotatably mounted and in which said seat is slidably but not rotatably engaged, and means locking said casing in said housing in a fixed position; a second chamber on the upstream side of said valve, and a selected boost venturi detachably mounted in said housing at the upstream entrance to said second chamber, said venturi having a fixed restriction which gives a selected value of pressure differential thereacross; an inlet to said fixed restriction from a source of air at a higher second pressure effective to cause flow thru said restriction, into said second chamber, past said valve in said seat, and into said first chamber; and means supporting said seat responsive to rotation of said casing relative to said supporting means and effective to slidably move said seat in relation to said casing, thereby varying the amount of engagement between said valve and said valve seat, whereby the opening through said valve can be adjusted to the value of the pressure differential across the said selected venturi.

2. An air pressure regulator suitable for use in a carburetor, comprising: a casing containing a valve, a valve seat, a sealed expansible chamber effective to move said valve in said valve seat, said casing being adapted to support one end of said expansible chamber in a first air chamber on the downstream side of said valve, said sealed expansible chamber being responsive to pressure and temperature of the air in said first chamber; a regulator housing in which said casing is rotatably mounted and in which said seat is slidably but not rotatably engaged, and means locking said casing in said housing in a fixed position; a second chamber on the upstream side of said valve, and a selected boost venturi detachably mounted in said housing at the upstream entrance to said second chamber, said venturi having a fixed restriction which gives a selected value of pressure differential thereacross; an inlet to said fixed restriction from a source of air at a higher second pressure effective to cause flow thru said restriction, into said second chamber, past said valve in said seat, and into said first chamber; and ring means threaded into said casing to adjustably support a spring opposing the expansion of said expansible chamber and to slidably support said seat, said spring being adjustable upon rotation of said spring supporting means relative to said casing to vary the deflection of said expansible chamber, thereby varying the amount of engagement between said valve and said valve seat, whereby the opening through said valve can be adjusted to the value of the pressure differential across the said selected venturi.

3. An air pressure regulator suitable for use in a carburetor, comprising: a casing containing a valve, a valve seat, a sealed expansible chamber effective to move said valve in said valve seat, said casing being adapted to support one end of said expansible chamber in a first air chamber on the downstream side of said valve, said sealed expansible chamber being responsive to pressure and temperature of the air in said first chamber; a regulator housing in which said casing is rotatably mounted and in which said seat is slidably but not rotatably engaged, and means locking said casing in said housing in a fixed position; a second chamber on the upstream side of said valve, and a selected boost venturi detachably mounted in said housing at the upstream entrance to said second chamber, said venturi having a fixed restriction which gives a selected value of pressure differential thereacross; an inlet to said fixed restriction from a source of air at a higher second pressure effective to cause flow thru said restriction, into said second chamber, past said valve in said seat, and into said first chamber; and ring means adjustably secured to said casing and threadedly engaging said seat to adjustably support a spring opposing the expansion of said expansible chamber and to slidably support said seat in said housing; said spring and seat supporting means being effective to vary engagement of said valve in said seat in response to movement of said seat when said means turns thereon, and in response to deflection of said spring when said ring means is adjusted with reference to said casing, whereby the opening through said valve can be adjusted to the value of the pressure differential across the said selected venturi.

4. An air pressure regulator suitable for use in a carburetor, comprising: a casing containing a valve, a valve seat, a sealed expansible chamber effective to move said valve in said valve seat, said casing being adapted to support one end of said expansible chamber in a first air chamber on the downstream side of said valve, said sealed expansible chamber being responsive to pressure and temperature of the air in said first chamber; a regulator housing in which said casing is rotatably mounted and in which said seat is slidably but not rotatably engaged, and means locking said casing in said housing in a fixed position; a second chamber on the upstream side of said valve, and a selected boost venturi detachably mounted in said housing at the upstream entrance to said second chamber, said venturi having a fixed restriction which gives a selected value of pressure differential thereacross; an inlet to said fixed restriction from a source of air at a higher second pressure effective to cause flow through said restriction, into said second chamber, past said valve in said seat, and into said first chamber; ring means threaded into said casing and threadedly engaging said seat to adjustably support a spring opposing the expansion of said expansible chamber and to slidably support said seat in said housing; and rotatable locking means in said ring means effective when said casing is disassembled from said housing to vary the periphery of said ring means thereby varying the torque required to rotate said ring means in said casing from a first value less than to a second value greater than the torque required to rotate said ring means on said valve seat; whereby said ring means is effective to vary engagement of said valve in said seat in response to movement of said seat when said ring means is turned thereon, and said ring means is independently effective to vary engagement of said valve in said seat in response to deflection of said spring when said ring means is turned in said casing, whereby the opening through said valve can be adjusted to the value of the pressure differential across the said selected venturi.

5. Valve operating means comprising a valve, a generally cylindrical casing having one end closed, an expansible bellows attached inside said closed end of said casing, and a connection between the other end of said bellows and said valve; a spring opposing expansion of said bellows, a retainer for the end of said spring threaded into said casing so as to be adjustable with respect to said closed end of said casing; means for locking said retainer in adjusted position in said casing; a seat for said valve, and a threaded connection between said seat and said retainer for moving said seat without changing the position of said retainer in relation to said bellows.

6. Fluid flow control apparatus, comprising a housing having a generally cylindrical recess therein, and inlet and outlet passages thru said housing opening into the bottom of said recess; an inverted cup-shaped casing slidably received in said recess and closing the outer end thereof, and interfitting shoulders on said housing and casing to locate said casing in said housing, said shoulders permitting relative rotation of said casing and housing; means for locking said casing to said housing to prevent such relative rotation, and means on said casing outside said housing for applying torque thereto to rotate said casing in said housing; an expansible bellows having one end fixed to the inside of said casing so that its opposite end moves with pressure variations therein, a valve movable with said opposite end of said bellows, and a seat for said valve surrounding one of said passages, said seat being slidable with respect to said housing; means holding said seat against rotation with respect to said housing, and a threaded connection between said casing and said seat, so that upon rotation of said casing in said housing said seat is moved with respect to said valve to vary the relationship between the pressure in said casing and the flow past said valve.

7. Fluid flow control apparatus, comprising a housing having a generally cylindrical recess therein, and inlet and outlet passages thru said housing opening into the bottom of said recess; an inverted cup-shaped casing slidably receivable in said recess and closing the outer end thereof, and interfitting shoulders on said housing and casing to locate said casing in said housing, said shoulders permitting relative rotation of said casing and housing; means for locking said casing to said housing, and means on said casing outside said housing for applying torque thereto to rotate said casing in said housing; an expansible bellows having one end fixed to the inside of said casing so that its opposite end moves with pressure variations therein, a valve movable with said opposite end of said bellows, and a seat for said valve surrounding one of said passages; an element connected to said seat and threadedly connected to said casing, and a spring opposing expansion on said bellows supported by said element, whereby rotation of said element in relation to said casing when said housing and said casing are disassembled is effective to vary said opposition of said spring and to move said valve in respect to said seat to vary the relationship between the pressure in said casing and the flow past said valve.

8. Coupling apparatus, comprising an inner sleeve, an outer sleeve, means associated with each sleeve for locking it against rotation, said inner sleeve being slidable longitudinally with respect to its locking means, an annular plate threadedly connected to said inner sleeve and to said outer sleeve, said plate having at least one slot extending inwardly from its outer circumference, a plug for spreading said slot so that said plate rotates with said outer sleeve whenever said plug is in place and said outer sleeve is rotated, but is rotatable relative to said outer sleeve whenever said plug is removed, said plate being effective to cause longitudinal movement of said inner sleeve with respect to its locking means when said plate is rotated with said plug in place and said outer sleeve is unlocked and rotated.

9. Valve control comprising a housing and a valve seat slidably engaged therein, a valve movable in said seat, a pressure responsive bellows, a first connection between said valve and one end of said bellows, a second connection between the other end of said bellows and a casing in which said bellows is mounted, flange means rotatably mounting said casing in said housing, clamping means operable to make said casing nonrotatable in said housing, a coupling threaded into said casing and onto said valve seat, and means for locking said coupling to said casing, said coupling being effective to cause sliding movement of said seat in respect to said housing and to vary the engagement of said valve in said seat when said casing and coupling are locked together and are rotated in relation to said housing.

10. Valve control comprising a housing and a valve seat slidably engaged therein, a valve movable in said seat, a pressure responsive bellows, a first connection between said valve and one end of said bellows, a second connection between the other end of said bellows and a casing in which said bellows is mounted, flange means rotatably mounting said casing in said housing, clamping means operable to make said casing non-rotatable in said housing, a coupling threaded into said casing and onto said valve seat, a spring mounted between said coupling and said bellows effective to oppose expansion thereof, said coupling being effective to vary the deflection of said spring thereby varying the engagement of said valve in said seat when said valve control is disassembled and said seat and coupling are rotated in relation to said casing but not to each other.

11. A control actuating device comprising a housing and a first control element slidably engaged therein, a second control element movable in said first element, a pressure responsive bellows having a predetermined length corresponding to a particular value of the pressure differential acting thereon whereby the normal response of said bellows is predetermined for all values of said pressure differential, a first connection between said second control element and one end of said bellows, a second connection between the other end of said bellows and a casing in which said bellows is mounted, flange means rotatably mounting said casing in said housing, clamping means operable to make said casing non-rotatable in said housing, a coupling threaded into said casing and onto said first control element, and means for locking said coupling to said casing, said coupling being effective to cause sliding movement of said first element in respect to said housing and to vary the position of said second element in said first element when said casing and coupling are locked together and are rotated in relation to said housing; whereby the relative position of said first and second control elements in respect to each other is variable without affecting said normal response of said bellows.

12. A control actuating device comprising a housing and a first control element slidably engaged therein, a second control element movable in said first element; a pressure responsive bellows having a predetermined length corresponding to a particular value of the pressure differential acting thereon, whereby the normal response of said bellows is predetermined for all values of said pressure differential; a first connection between said second element and one end of said bellows, a second connection between the other end of said bellows and a casing in which said bellows is mounted, a flange rotatably mounting said casing in said housing, clamping means operable to make said casing non-rotatable in said housing, a coupling threaded into said casing and onto said first control element, a spring mounted between said coupling and said bellows effective to oppose expansion thereof, said coupling being effective to vary the deflection of said spring, thereby varying the position of said second control element in said first control element when said control actuating device is disassembled and said seat and coupling are rotated in relation to said casing but not to each other, said spring deflection variation being effective to modify said normal response of said bellows.

JACOB S. SILVER.

REFERENCES CITED

The following references are of record in the file of this patent:

UNITED STATES PATENTS

| Number | Name | Date |
|---|---|---|
| 1,058,171 | Froelich | Apr. 8, 1913 |
| 1,338,024 | Lee | Apr. 27, 1920 |
| 1,585,732 | Otto | May 25, 1926 |
| 2,239,445 | Martin | Apr. 22, 1941 |
| 2,258,295 | Merz | Oct. 7, 1941 |
| 2,381,358 | Marshall | Aug. 7, 1945 |
| 2,391,755 | Twyman | Dec. 25, 1945 |